United States Patent
Wang

(10) Patent No.: US 6,697,125 B1
(45) Date of Patent: Feb. 24, 2004

(54) METHOD OF IMPLEMENTING OSD FUNCTION AND DEVICE THEREOF

(75) Inventor: Chi-Hui Wang, Hsinchu (TW)

(73) Assignee: Winbond Electronics Corporation, Hsinchu (TW)

(*) Notice: Subject to any disclaimer, the term of this patent is extended or adjusted under 35 U.S.C. 154(b) by 426 days.

(21) Appl. No.: 09/685,679

(22) Filed: Oct. 10, 2000

(30) Foreign Application Priority Data

Nov. 9, 1999 (TW) .................................. 88119608 A

(51) Int. Cl.$^7$ ................................................ H04N 5/50
(52) U.S. Cl. .................... 348/569; 348/716; 348/718
(58) Field of Search ......................... 348/563, 564, 348/565, 567, 569, 571, 572, 468, 467, 714, 716, 718; 345/560, 540, 545, 547, 570, 571, 572, 467–470, 141; 711/157, 105, 104, 154, 217

(56) References Cited

U.S. PATENT DOCUMENTS

| | | | | |
|---|---|---|---|---|
| 4,885,703 A | * | 12/1989 | Deering ....................... | 345/422 |
| 4,908,706 A | * | 3/1990 | Bugg ......................... | 348/468 |
| 5,574,880 A | * | 11/1996 | Shaw ......................... | 711/104 |
| 5,590,260 A | * | 12/1996 | Morse et al. ................. | 345/467 |
| 5,742,797 A | * | 4/1998 | Celi, Jr. et al. .............. | 395/507 |
| 5,781,201 A | * | 7/1998 | McCormack et al. ......... | 345/544 |
| 5,805,173 A | * | 9/1998 | Glennon et al. .............. | 345/501 |
| 5,815,143 A | * | 9/1998 | Jenney et al. ................. | 345/563 |
| 5,845,329 A | * | 12/1998 | Onishi et al. ................ | 711/157 |
| 5,859,670 A | * | 1/1999 | Van Gestel .................. | 348/473 |
| 5,940,072 A | * | 8/1999 | Jahanghir et al. ............ | 345/716 |
| 5,969,770 A | * | 10/1999 | Horton ........................ | 348/569 |
| 6,028,596 A | * | 2/2000 | Oka ............................ | 345/555 |
| 6,108,015 A | * | 8/2000 | Cross .......................... | 345/519 |
| 6,125,432 A | * | 9/2000 | Hanami et al. .............. | 711/157 |
| 6,275,535 B1 | * | 8/2001 | Bramley et al. ......... | 375/240.25 |
| 6,370,323 B1 | * | 4/2002 | Adolph et al. .............. | 386/104 |
| 6,373,526 B1 | * | 4/2002 | Kessler et al. .............. | 348/468 |
| 6,456,746 B2 | * | 9/2002 | Freeman ..................... | 382/305 |
| 6,462,744 B1 | * | 10/2002 | Mochida et al. ............. | 345/543 |
| 6,470,051 B1 | * | 10/2002 | Campisano et al. ... | 375/240.21 |
| 6,480,238 B1 | * | 11/2002 | Knox et al. ................. | 348/569 |
| 6,486,884 B1 | * | 11/2002 | Aleksic et al. .............. | 345/571 |
| 6,493,043 B1 | * | 12/2002 | Bollmann et al. .......... | 348/714 |
| 2002/0193893 A1 | * | 12/2002 | Li et al. ....................... | 700/94 |

FOREIGN PATENT DOCUMENTS

EP 0343740 A2 * 11/1989
EP 00343740 A2 * 11/1989

* cited by examiner

Primary Examiner—Victor R. Kostak
(74) Attorney, Agent, or Firm—Knoble & Yoshida, LLC

(57) ABSTRACT

A method of implementing on screen display (OSD) function and a device thereof are provided. The method includes the steps of storing the graphic data in a dynamic random access memory (DRAM), obtaining the displaying information and a sequence for the graphic data by an OSD decoder, and showing the graphic data by an address generator on a screen according to the displaying information and the displaying sequence. The device includes a dynamic random access memory (DRAM) for storing the graphic data, an OSD decoder for obtaining a sequence according to the stored graphic data, and an address generator electrically connected to the DRAM and the OSD decoder for showing the graphic data on a screen according to the sequence.

17 Claims, 4 Drawing Sheets

METHOD OF IMPLEMENTING OSD FUNCTION AND DEVICE THEREOF

FIELD OF THE INVENTION

The present invention is related to a method of implementing on screen display (OSD) function and a device thereof, and particularly to a method of implementing on screen display (OSD) function and a device thereof by using a dynamic random access memory (DRAM).

BACKGROUND OF THE INVENTION

On screen display (OSD) function is basically implemented for showing the important information, e.g. Time, TV channel, and Video Setting, for the users on the screen. According to the prior art of implementing OSD function, the read-only-memory (ROM) is usually used for storing the graphic data. Certainly, the desired shown graphic data must be written into the ROM in advance, and which can then be read out from the ROM when one desire to show the graphic data on a screen. However, the graphic data stored in the ROM can't be changed any more, therefore the method of implementing OSD function according to the prior art have some disadvantages as follows.

(a) The memory space of the ROM used for storing the graphic data is large, therefore the manufacturing cost of the ROM is high. If we desire to lower the manufacturing cost of the ROM, the number of the characters stored in the ROM would be limited.

(b) The characters stored in the ROM can't be changed from one font to another font.

(c) The displaying position of the graphic data on the screen can't be moved.

The present invention not only solves the problems as mentioned above, but also provides a method of storing the graphic data in a dynamic random access memory (DRAM) for implementing OSD function.

SUMMARY OF THE INVENTION

An object of the present invention is to provide a method and a device of implementing on screen display (OSD) function for lowing the manufacturing cost.

Another object of the present invention is to provide a method and a device of implementing on screen display (OSD) function for improving the flexibility of changing the fonts.

A further object of the present invention is to provide a method and a device of implementing on screen display (OSD) function for easily moving the displaying position of the graphic data on the screen.

According to the first aspect of the present invention, a method of implementing on screen display (OSD) function is provided. The method comprises the steps of storing the graphic data in a dynamic random access memory (DRAM), obtaining the displaying information and a sequence for the graphic data by an OSD decoder, and showing the graphic data by an address generator on a screen according to the displaying information and the displaying sequence.

Preferably, the graphic data is composed of a plurality of characters.

Preferably, the dynamic random access memory (DRAM) is a local dynamic random access memory (DRAM) of a graph-showing device.

Preferably, the graph-showing device is a MPEG decoder.

Preferably, the graphic data is stored in the unused and fractional memory space of the dynamic random access memory (DRAM).

Preferably, the displaying information includes the displaying position, the displaying color and the displaying number of the characters, and the height of the displaying region for the graphic data on the screen.

Preferably, the address generator is a static random access memory (SRAM).

According to the second aspect of the present invention, a device of implementing on screen display (OSD) function is provided. The device comprises a dynamic random access memory (DRAM) for storing the graphic data, an OSD decoder for obtaining a sequence according the stored graphic data, and an address generator electrically connected to the DRAM and the OSD decoder for showing the graphic data on a screen according to the sequence.

Preferably, the graphic data is composed of a plurality of characters.

Preferably, the dynamic random access memory (DRAM) is a local dynamic random access memory (DRAM) of a graph-showing device.

Preferably, the graph-showing device is a MPEG decoder.

Preferably, the graphic data is stored in the unused and fractional memory space of the dynamic random access memory (DRAM).

Preferably, the address generator is a static random access memory (SRAM).

According to the third aspect of the present invention, a method of storing the graphic data in a dynamic random access memory (DRAM) for implementing OSD function is provided. The method comprises the steps of dividing each graphic data into a plurality of lines, arranging the corresponding same lines of each graphic data into the corresponding same pages respectively and producing a plurality of corresponding pointers thereinto for pointing the addresses of next pages to link the plural pages, and storing the plural pages in the unused and fractional space of the dynamic random access memory (DRAM).

Preferably, the graphic data is composed of a plurality of characters.

Preferably, the dynamic random access memory (DRAM) is a local dynamic random access memory (DRAM) of a graph-showing device.

Preferably, the graph-showing device is a MPEG decoder.

BRIEF DESCRIPTION OF THE DRAWING

The present invention may best be understood through the following description with reference to the accompanying drawings, in which.

DETAILED DESCRIPTION OF THE PREFERRED EMBODIMENTS

Figure 1:
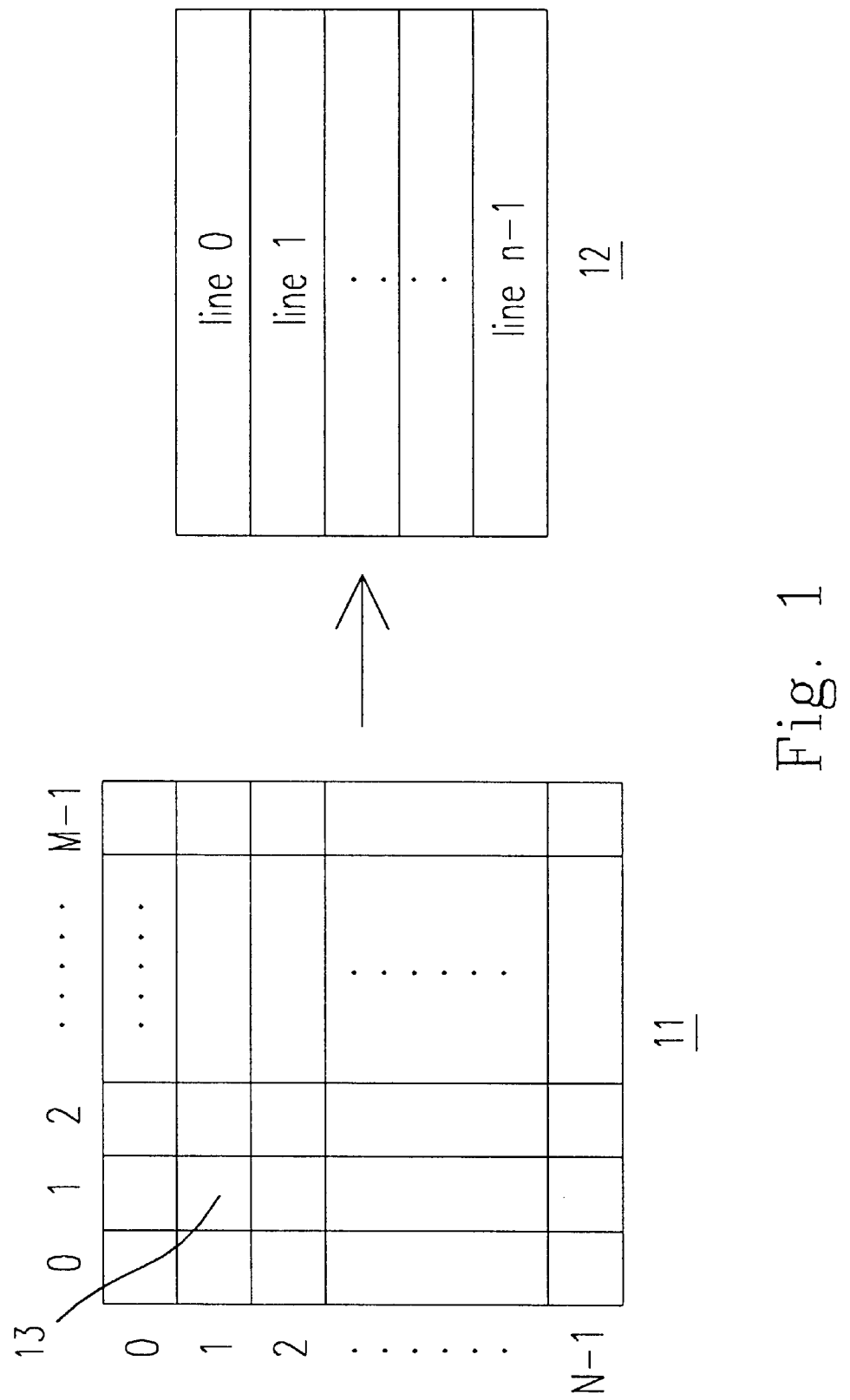
FIG. 1 is a schematic diagram showing how to divide the graphic data for storing which into the dynamic random access memory (DRAM) according to the present invention.

Please refer to FIG. 1 which is a schematic diagram showing how to divide the graphic data 11 for storing which into the dynamic random access memory (DRAM) according to the present invention. For storing the graphic data 11 of M×N pixels into the dynamic random access memory (DRAM), the graphic data 11 is divided into a plurality of lines.

Certainly, we must be sure that the width of the DRAM access unit is greater than that of the graphic data 11. For example, we may set that there are 16 pixels in a line. That is, there are 32 bits in a line if one pixel takes two bits. The graphic data 11 is then divided as "line 0, line 1, line 2, ..., line N−1".

Figure 2:
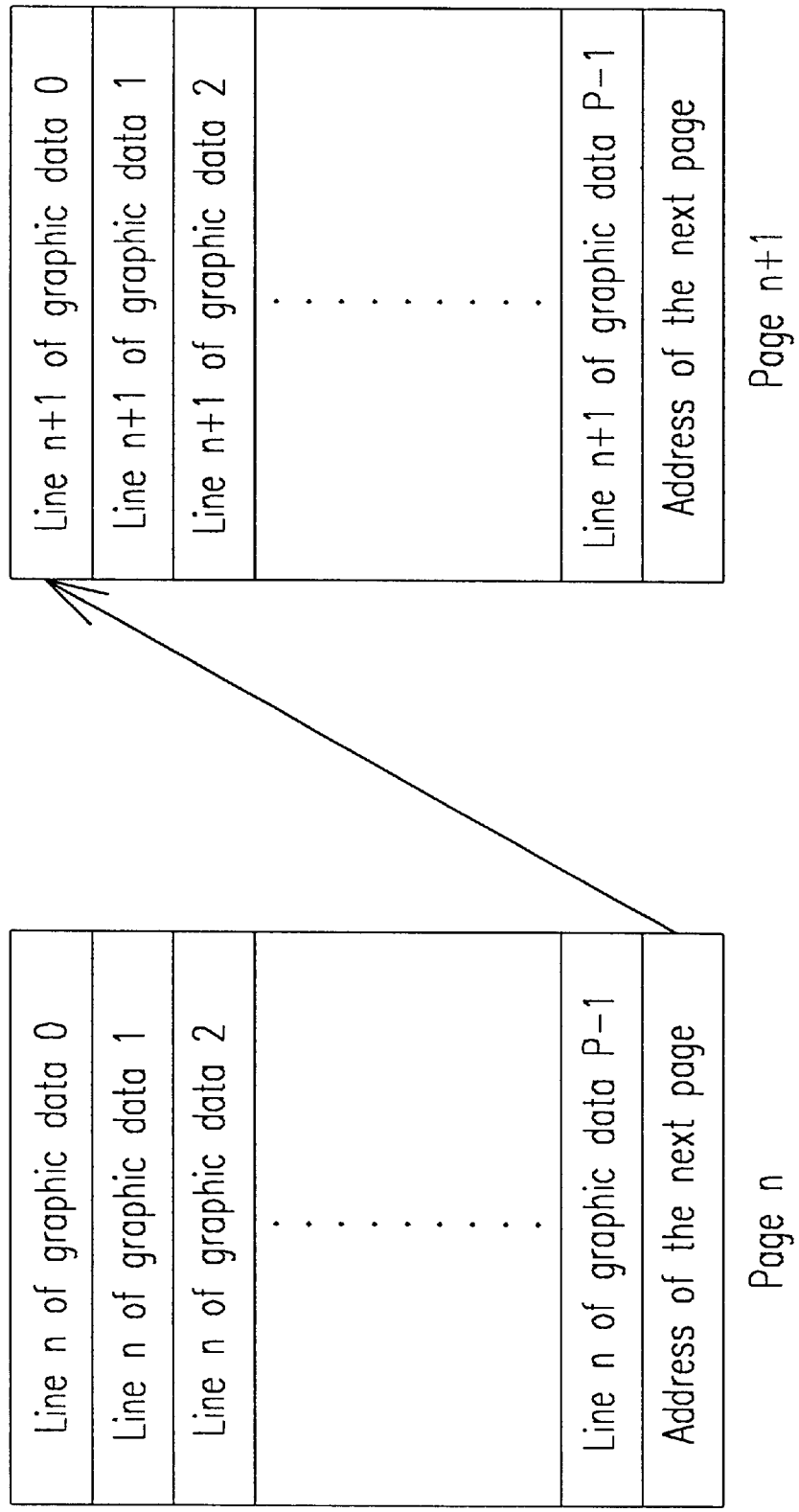
FIG. 2 is a schematic diagram showing how to store the graphic data into the dynamic random access memory (DRAM) according to the present invention.

Please refer to FIG. 2 which is a schematic diagram showing how to store the graphic data into the dynamic random access memory (DRAM) according to the present invention. Each graphic data 11 is divided as "line 0, line 1, line 2, ..., line N−1" as shown in FIG. 1. The corresponding same lines of each graphic data are then arranged into the corresponding same pages. For example, there are P graphic data, and there are N lines in each graphic data. Then, the graphic data is arranged in N pages, and there are P lines in each page. "line n of graphic data 0, line n of graphic data 1, ..., line n of graphic data P−1" are stored in page n in sequence. "line n +1 of graphic data 0, line n +1 of graphic data 1, ..., line n+1 of graphic data P−1" are stored in page n+1 in sequence. Page n and page n+1 are linked by an address of the page n+1 stored in the end line of page n, therefore the graphic data can be stored in the unused and fractional memory space of the DRAM. Besides, because the corresponding same lines of each graphic data are arranged into the corresponding same pages, the speed of transmitting data is quick. This minimize DRAM cross page delay in period of every horizontal sync. Pixel data transforming delay from DRAM is critical to video showing device.

Figure 3:
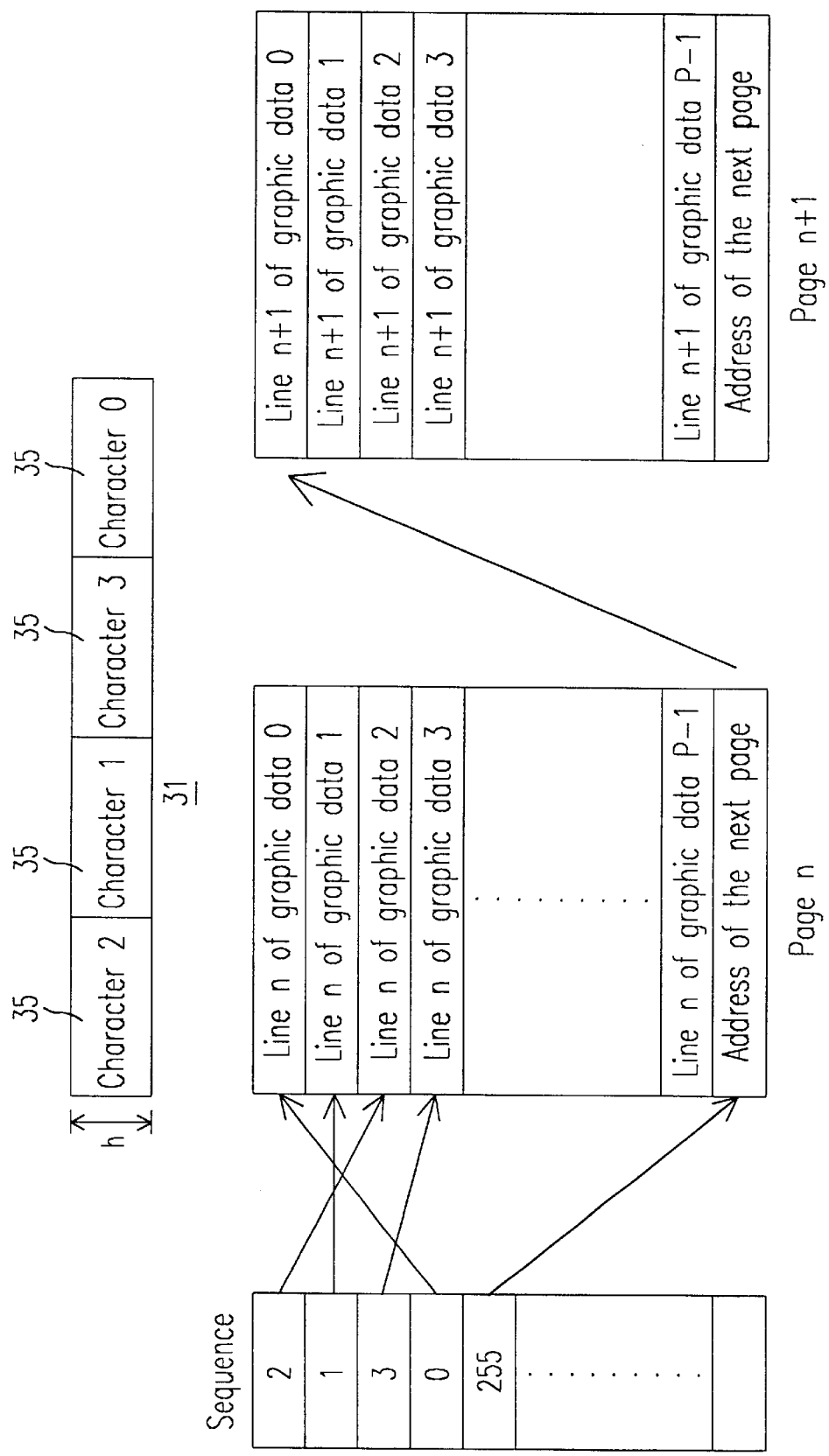
FIG. 3 is a schematic diagram showing the method of implementing on screen display (OSD) function according to the present invention.

Please refer to FIG. 3 which is a schematic diagram showing the method of implementing on screen display (OSD) function according to the present invention. We take the graphic composing of a plurality of characters as an example. The displaying information including the displaying position, the displaying color and the displaying number of the characters 35, and the height of the displaying region 31 are obtained by an OSD decoder. The OSD decoder also obtains a sequence which is stored in an address generator 32 for displaying the characters in sequence. Therefore, the address generator 32 can show the characters on the screen according to the displaying information and the sequence.

For showing the characters "2130" on the screen, the OSD decoder obtains a sequence "2130" first, and the sequence "2130" is stored in the address generator. Therefore, the address generator can then show the characters "2130" on the screen according to the sequence by reading the data of each line from page 0 to page N−1. N is vertical size of characters "2130". One page is changed into another page when 255 of each page is read by the address generator. The address of the next page is stored in the end line of the present page.

Figure 4:
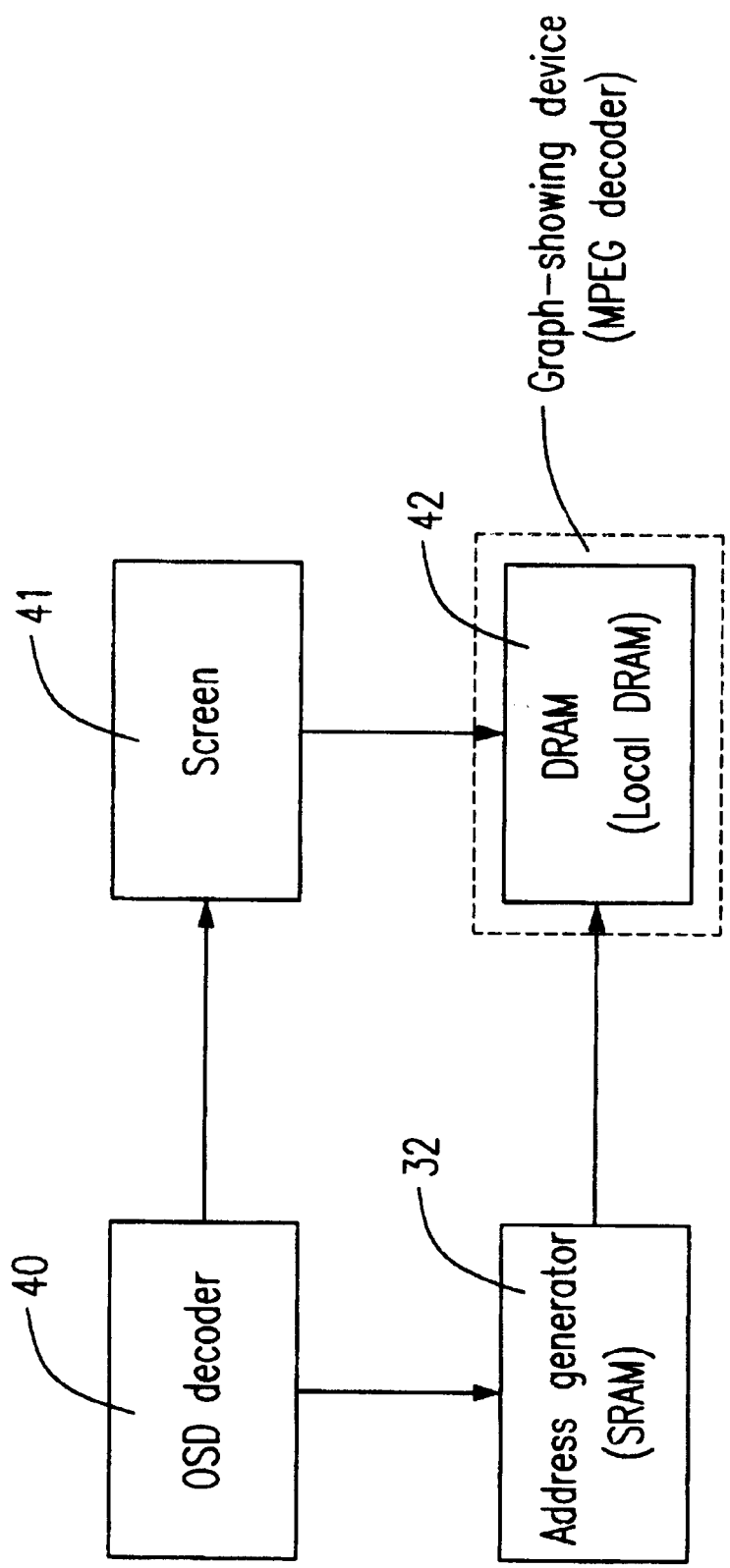
FIG. 4 is a schematic diagram showing the architecture of the device for implementing on screen display (OSD) function according to the present invention.

Please refer to FIG. 4 which is a schematic diagram showing the architecture of the device for implementing on screen display (OSD) function according to the present invention. The device for implementing on screen display (OSD) function includes a dynamic random access memory (DRAM) 42 for storing the graphic data, an OSD decoder 40 for obtaining a sequence according to the stored graphic data, and an address generator 32 electrically connected to the DRAM 42 and the OSD decoder 40 for showing the graphic data on a screen 41 according to the sequence. The sequence obtained by the OSD decoder 40 which is stored in an address generator 32 is used for displaying the characters on the screen 41 in sequence.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

I claim:

1. A method of implementing on screen display (OSD) function, comprising steps of:

storing the graphic data in a dynamic random access memory (DRAM), wherein the steps includes:
dividing each graphic data into a plurality of lines;
arranging the corresponding same lines of each graphic data into the corresponding same pages and producing a plurality of corresponding pointers thereinto for pointing the addresses of next pages to link said plural pages; and
storing said plural pages in the unused and fractional space of said dynamic random access memory (DRAM);
obtaining the displaying information and a sequence for said graphic data by an OSD decoder; and
showing the graphic data by an address generator on a screen according to said displaying information and said sequence.

2. The method according to claim 1 wherein said graphic data is composed of a plurality of characters.

3. The method according to claim 1 wherein said dynamic random access memory (DRAM) is a local dynamic random access memory (DRAM) of a graph-showing device.

4. The method according to claim 3 wherein said graph-showing device is a MPEG decoder.

5. The method according to claim 1 wherein said graphic data is stored in the unused and fractional memory space of said dynamic random access memory (DRAM).

6. The method according to claim 1 wherein said displaying information includes the displaying position, the displaying color and the displaying number of the characters, and the height of the displaying region for said graphic data on said screen.

7. The method according to claim 1 wherein said address generator is a static random access memory (SRAM).

8. A device of implementing on screen display (OSD) function, comprising:

a dynamic random access memory (DRAM) for storing the graphic data, wherein the graphic data is stored by the method according to claim 1;
an OSD decoder for decoding said graphic data into an address; and
an address generator electrically connected to said DRAM and said OSD decoder for showing said graphic data on a screen.

9. The device according to claim 8 wherein said graphic data is composed of a plurality of characters.

10. The device according to claim 8 wherein said dynamic random access memory (DRAM) is a local dynamic random access memory (DRAM) of a graph-showing device.

11. The device according to claim 10 wherein said graph-showing device is a MPEG decoder.

12. The device according to claim 8 wherein said graphic data is stored in the unused and fractional memory space of said dynamic random access memory (DRAM).

13. The device according to claim 8 wherein said address generator is a static random access memory (SRAM).

14. A method of storing the graphic data in a dynamic random access memory (DRAM) for implementing OSD function, comprising steps of:

dividing each graphic data into a plurality of lines;

arranging the corresponding same lines of each graphic data into the corresponding same pages and producing a plurality of corresponding pointers thereinto for pointing the addresses of next pages to link said plural pages; and storing said plural pages in the unused and fractional space of said dynamic random access memory (DRAM).

15. The method according to claim 14 wherein said graphic data is composed of a plurality of characters.

16. The method according to claim 14 wherein said dynamic random access memory (DRAM) is a local dynamic random access memory (DRAM) of a graph-showing device.

17. The method according to claim 16 wherein said graph-showing device is a MPEG decoder.

* * * * *